(12) United States Patent
Hano et al.

(10) Patent No.: US 7,000,998 B2
(45) Date of Patent: Feb. 21, 2006

(54) BRAKE CONTROL APPARATUS AND METHOD

(75) Inventors: Sunao Hano, Kanagawa (JP); Tomoaki Fujibayashi, Kanagawa (JP); Masahiro Nakamizo, Kanagawa (JP)

(73) Assignee: HItachi, Ltd., Tokyo-to (JP)

( * ) Notice: Subject to any disclaimer, the term of this patent is extended or adjusted under 35 U.S.C. 154(b) by 8 days.

(21) Appl. No.: 10/345,284

(22) Filed: Jan. 16, 2003

(65) Prior Publication Data

US 2003/0137192 A1    Jul. 24, 2003

(30) Foreign Application Priority Data

Jan. 18, 2002  (JP)  ............................. 2002-010639
Apr. 22, 2002  (JP)  ............................. 2002-119092

(51) Int. Cl.
  *B60T 8/32*   (2006.01)
(52) U.S. Cl. ................................. 303/191; 188/DIG. 2
(58) Field of Classification Search .......... 188/DIG. 2; 303/155, 157, 159, 166, 191, 192; 11/11; 192/219.1, 219.2, 219.3; 475/196, 198, 199
See application file for complete search history.

(56) References Cited

U.S. PATENT DOCUMENTS

| | | | | |
|---|---|---|---|---|
| 4,852,950 A | * | 8/1989 | Murakami | 303/192 |
| 5,916,062 A | * | 6/1999 | Siepker | 477/194 |
| 6,199,964 B1 | * | 3/2001 | Ota et al. | 303/192 |
| 6,260,934 B1 | * | 7/2001 | Lee | 303/192 |
| 6,364,436 B1 | * | 4/2002 | Sawada | 303/191 |

FOREIGN PATENT DOCUMENTS

| | | | |
|---|---|---|---|
| JP | 363188556 | * | 8/1988 |
| JP | 407165036 | * | 6/1995 |
| JP | 407323836 | * | 12/1995 |
| JP | 10-181575 A | | 7/1998 |

* cited by examiner

*Primary Examiner*—Devon C. Kramer
(74) *Attorney, Agent, or Firm*—Foley & Lardner LLP

(57) ABSTRACT

A brake control apparatus includes a vehicle sensor to sense a vehicle condition, and a control unit to start a hill hold control to hold a vehicle in a stop state by a braking force produced by a brake actuator even after an end of the driver's braking operation, in accordance with a hill hold control start adjustment parameter determined from the sensed vehicle condition. The parameter may be a variable indicative of a gradient of a road.

29 Claims, 7 Drawing Sheets

BRAKE CONTROL APPARATUS AND METHOD

BACKGROUND OF THE INVENTION

The present invention relates to a brake control apparatus and/or method for a hill hold control to prevent a vehicle from moving when a driver brakes the vehicle to a stop and then releases the brake pedal to depress the accelerator pedal.

A vehicle brake system capable of performing such a hill hold control is disclosed in Published Japanese Patent application Kokai No. H10(1998)-181575.

SUMMARY OF THE INVENTION

It is an object of the present invention to provide a brake control apparatus and/or method adapted to perform a hill hold control adequately in conformity with a gradient of a road.

According to the present invention, a brake control apparatus comprises: a master cylinder to produce a brake fluid pressure in response to a driver's braking operation; a brake actuating section connected with the master cylinder, to receive the brake fluid pressure from the master cylinder and to produce a braking force to brake a vehicle; a vehicle sensor to sense a vehicle condition; and a hill hold control section to initiate a hill hold control to hold the vehicle in a stop state by the braking force produced by the brake actuating section even after an end of the driver's braking operation, in accordance with a hill hold control start adjustment parameter determined from the vehicle condition sensed by the vehicle sensor when the vehicle is in the stop state.

According to the present invention, a hill hold brake control process comprises: examining whether a vehicle is in a predetermined stop state; initiating a hill hold control to hold the vehicle in the stop state at a hill hold start timing determined by comparing a first parameter indicative of a driver's brake pedal force with a first threshold; and adjusting the hill hold control start timing to initiate the hill hold control in accordance with a gradient parameter indicative of a road gradient.

The other objects and features of this invention will become understood from the following description with reference to the accompanying drawings.

DETAILED DESCRIPTION OF THE INVENTION

Figure 1:
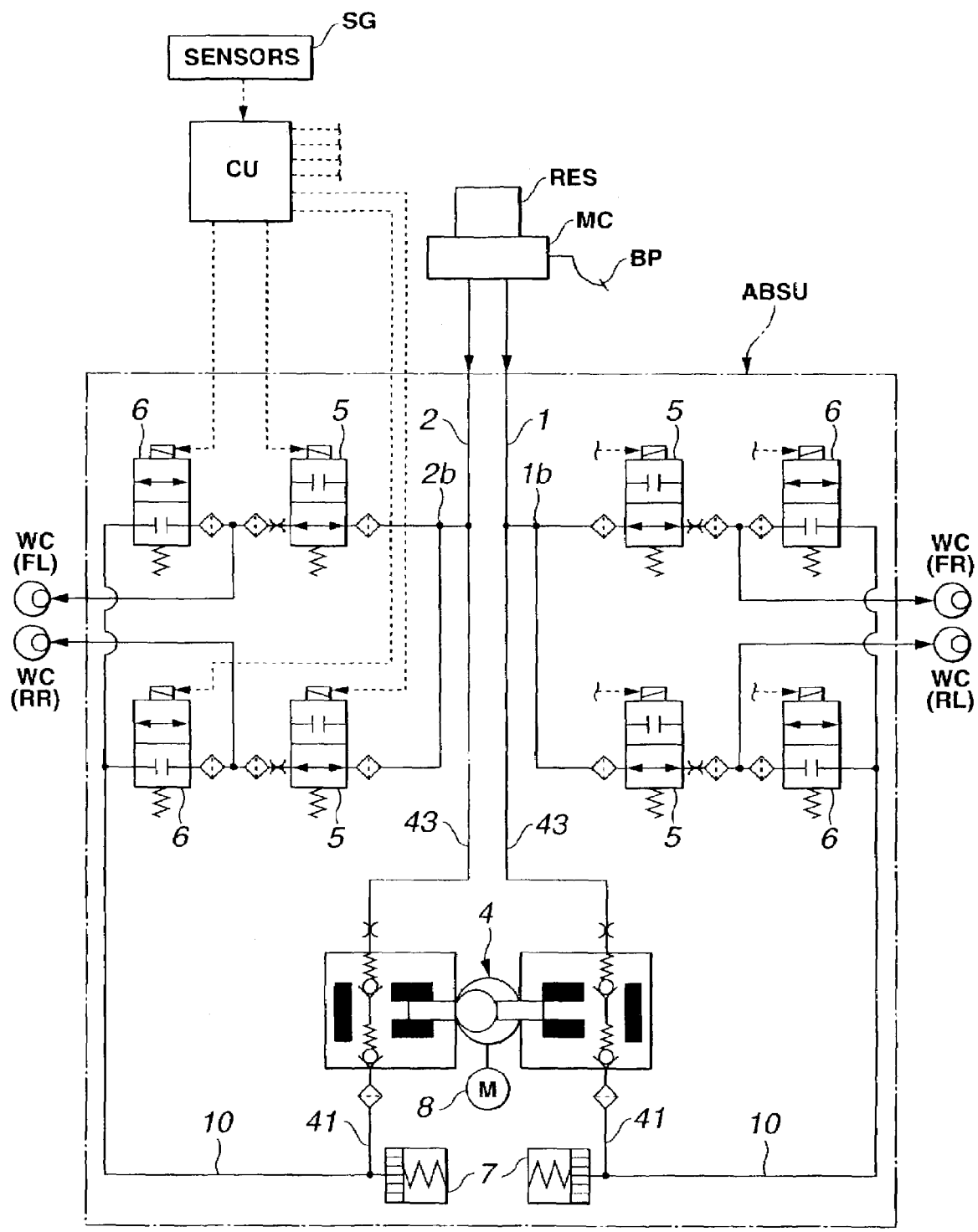
FIG. 1 is a schematic view showing a brake system according to a first embodiment of the present invention.

FIG. 1 shows a brake control apparatus or system according to a first embodiment of the present invention. In this example, this brake control system is mounted on a vehicle equipped with an automatic transmission including a torque converter and a planetary gear system.

A master cylinder MC is a primary source of pressure in a hydraulic brake system. Master cylinder MC of this example is of a known tandem type, and supplies a brake fluid through first and second brake circuits 1 and 2 to a brake actuating section including wheel cylinders WC, when a brake pedal BP is depressed. Master cylinder MC is provided with a reservoir RES to store the brake fluid. The upstream section of each of the first and second brake circuits 1 and 2 serves as a supply circuit to supply the brake fluid pressure from master cylinder MC to the brake actuating section.

First and second hydraulic brake circuits 1 and 2 are arranged in the form of X-piping. In other words, the first circuit 1 is branched at a branch point 1b, and arranged to connect front right wheel cylinder WC(FR) and rear left wheel cylinder WC(RL); and the second circuit 2 is branched at a branch point 2b, and arranged to connect front left wheel cylinder WC(FL) and rear right wheel cylinder WC(RR).

In this embodiment, an ABS unit ABSU of an existing type is used to form a hill hold control system in the following manner.

On the downstream side (on the wheel cylinder's side) of the branch point 1b or 2b of each brake circuit 1 or 2, there are provided an inflow valve 5 and an outflow valve 6 for each wheel cylinder WC. The inflow valve 5 of this example is a normally-open solenoid valve of an ON-OFF type. The outflow valve 6 is a normally-closed solenoid valve of an ON-OFF valve. The inflow valve 5 is disposed in the downstream section of the brake circuit 1 or 2 on the downstream side of the branch point 1b or 2b. The outflow valve 6 is connected to a drain circuit 10 which extends from the downstream side of the outflow valve 6 to a reservoir 7. The inflow and outflow valves 5 and 6 serve as a pressure control valve or section. These valves 5 and 6 further serve as a section for confining the brake fluid in the wheel cylinder WC. The pressure control section composed of the inflow and outflow valves 5 and 6 is in a pressure increase state to increase the brake fluid pressure in the wheel cylinder WC by opening the fluid communication between the upstream section and the downstream section of the brake circuit 1 or 2 when inflow valve 5 is opened and outflow valve 6 is closed. When inflow and outflow valves 5 and 6 are both closed, the pressure control section is in a pressure hold state to confine the brake fluid pressure in the wheel cylinder WC. When inflow valve 5 is closed and outflow valve 6 is opened, the pressure control section is in a pressure decrease state to draw off the brake fluid pressure from the wheel cylinder WC, to the reservoir 7.

A brake system for the ABS control, in general, is provided with a bypass circuit for returning the brake fluid to the master cylinder, despite the inlet valve 5 being closed to perform the ABS control, immediately when the brake operation is cancelled by the driver; and a one-way valve for allowing only this return flow of the brake fluid. In the example of FIG. 1, however, such bypass passage and one-way valve are omitted, and the construction is simplified.

A pump 4 is connected with the brake circuits 1 and 2. This pump 4 sucks the brake fluid conveyed to the reservoir 7 by the ABS control operation, through a suction circuit 41, and returns the fluid to the brake circuits 1 and 2 through a discharge circuit 43. In this example, the pump 4 is a plunger pump driven by a motor 8.

Therefore, the brake control system according to this embodiment can prevent wheel locking on braking in the ABS control by controlling the inflow and outflow valves 5 and 6, and thereby controlling the brake fluid pressure in each wheel cylinder WC in the pressure increase mode, pressure hold mode and pressure decrease mode to achieve an optimum brake fluid pressure. During the ABS control, the brake fluid is returned from the reservoirs 7 to the brake circuits 1 and 2.

A control unit CU is a controller for controlling the motor 8 (for pump 4), and each of the inflow and outflow valves 5 and 6 for the ABS control. The control unit CU is connected with a sensor group (or sensor section) SG, and arranged to receive input information on various vehicle operating conditions. In this example, the sensor group includes a pressure sensor for sensing a pressure of the master cylinder MC (master cylinder fluid pressure), a vehicle speed sensor for sensing a vehicle speed, and wheel speed sensors for sensing the wheel speed of each wheel of the vehicle.

In addition to the above-mentioned ABS control (anti-lock brake control), the control unit CU carries out a hill hold control in the following manner.

By the creep of the torque converter in the automatic transmission, the vehicle can maintain a stop state on an incline, without the aid of a brake pedal operation, while the engine is producing a driving force. If, however, the engine is stopped by an idle stop control to stop the engine temporarily in the case of the vehicle being in the stop state with the engine idling, the vehicle loses the forward driving torque by the creep, and hence the vehicle starts to move when the brake pedal is released. To hold the vehicle stationary in such a situation, the brake control apparatus according to this embodiment carries out the hill hold control by producing the braking force to hold the vehicle in the stop state, and to prevent unnatural feeling of the driver.

Figure 2:
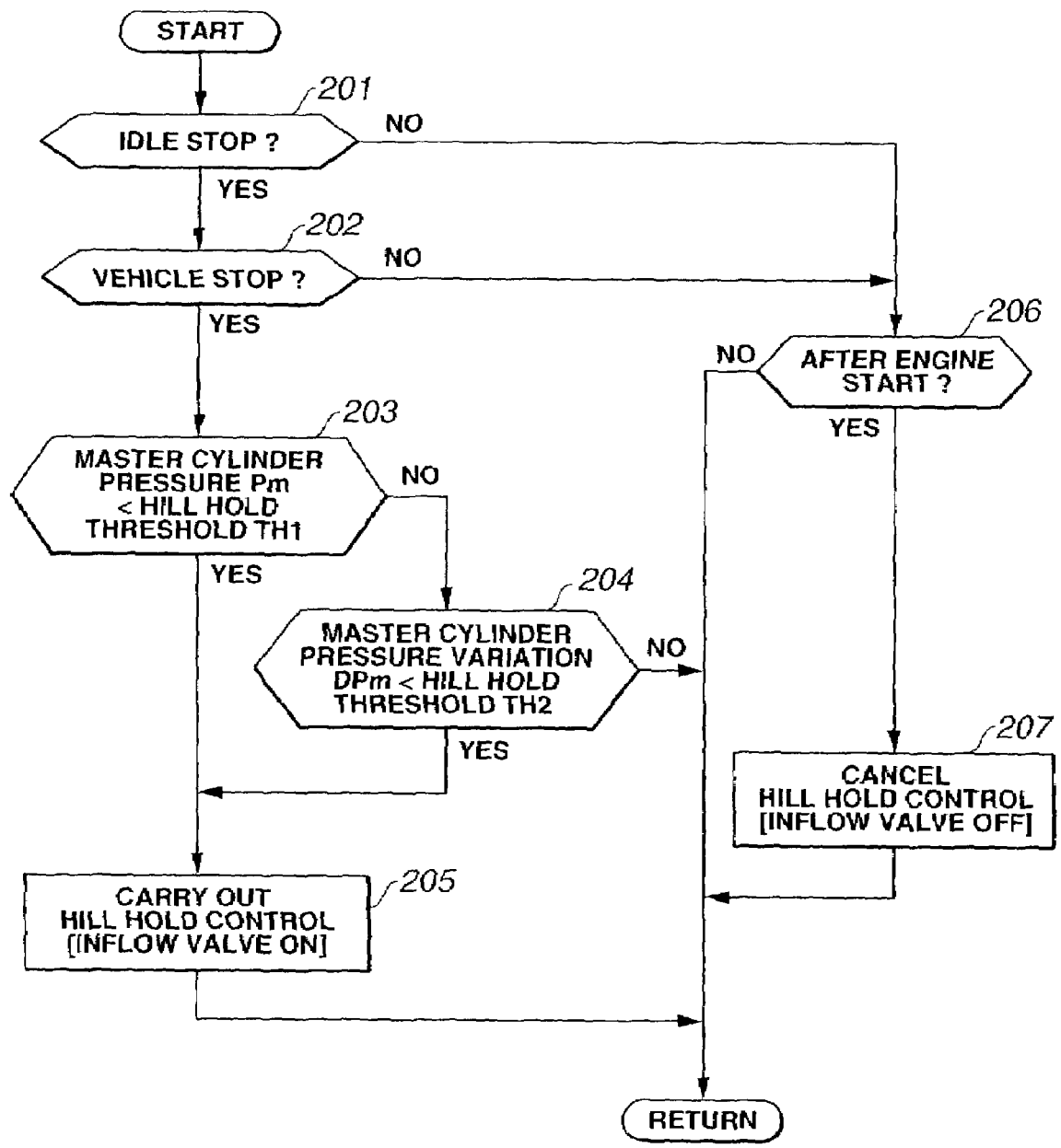
FIG. 2 is a flowchart showing a hill hold brake control process according to the first embodiment.

FIG. 2 shows a hill hold control process according to this embodiment, for determining whether to carry out or cancel the hill hold control.

Step 201 examines whether the engine is in an idle stop operation, or not. The routine of FIG. 2 proceeds to step 202 during the idle stop operation, and to step 206 when the engine is not in the idle stop operation. This idle stop operation is a control operation to stop the engine when the vehicle is brought to a stop with the engine in the idling state, and to hold the engine in the stop state until the driver indicates an intention to start.

In the case of the idle stop, step 202 examines whether the vehicle is in a stop state, or not. The routine proceeds to step 203 when the vehicle is in the stop state, and to step 206 when the vehicle is not in the stop state.

Step 203 examines whether the master cylinder pressure Pm is lower than a predetermined first hill hold control start judgment threshold TH1 or not. The routine proceeds to step 205 when the master cylinder pressure Pm is lower than the first threshold TH1 (Pm<TH1), and to step 204 when the master cylinder pressure Pm is higher than or equal to the first threshold TH1 (Pm≧TH1). The first hill hold control start judgment threshold (or pressure threshold) TH1 is set equal to a pressure value adequate to detect a brake pedal release operation by the driver, and to enable the brake system to hold the vehicle at the stop state on a slope of an inclination angle smaller than or equal to a predetermined angle. It is possible to determine an optimum value of the first threshold TH1 for each vehicle make and type by repetition of experiments.

Step 204 examines whether a variation DPm of the master cylinder pressure Pm is smaller than a predetermined second hill hold control start judgment threshold (or variation threshold) TH2. The master cylinder pressure variation used in step 204 of this example is a time rate of change of the master cylinder pressure. This master cylinder pressure variation is negative when the master cylinder pressure is decreasing. The routine proceeds to step 205 when the master cylinder pressure variation DPm is smaller than the second threshold TH2 (DPm<TH2). When the master cylinder pressure variation DPm is greater than or equal to the second threshold TH2 (DPm≧TH2), this routine ends.

Second threshold TH2, too, is set to an optimum value determined by experiments. Second threshold TH2 is set equal to a rate of change of the master cylinder pressure Pm obtained when the brake pedal BP is released on a slope of an inclination angle greater than a predetermined angle. On a sloping road, a step change operation from the brake pedal BP to the accelerator pedal is rapid as compared to the step change on a level road, and accordingly, the master cylinder pressure variation becomes smaller. In this case, the master cylinder pressure Pm is varied in the decreasing direction, and the master cylinder pressure variation is on the negative side. Therefore, the absolute value of the master cylinder pressure variation becomes greater on the sloping road. Thus, the control system can determine whether the slope is steeper than a predetermined inclination, by examining the master cylinder pressure variation.

Step 205 is reached from step 203 when Pm<TH1 or from step 204 when DPm<TH2. Step 205 carries out a hill hold control operation. In the hill hold control operation of this example, the control system closes the inflow valves 5 by ON signal. In this state, therefore, the control system confines the brake fluid pressure in each wheel cylinder WC by the inflow valves 5 together with the normally-closed outflow valves 6, and thereby holds the vehicle in the stop state.

In this example, the hill hold control is carried out when first, second and third conditions are all met. The first condition is met when the engine is in the idle stop state. The second condition is met when the vehicle is in the stop state. The third condition is met when the master cylinder pressure is lower than the first threshold TH1 or when the master cylinder pressure variation is smaller than the second threshold TH2 though the master cylinder pressure is equal to or higher than the first threshold TH1.

Step 206 is reached in the case of the negative answer of step 201 when the engine is not in the idle stop state, or in the case of the negative answer of step S202 when the vehicle is not in the stop state. Step 206 examines whether the engine is started or not. After a start of the engine, the routine proceeds to step 207 and cancels the hill hold control. When the engine is not yet started, then this routine ends. In the hill hold cancellation of this example, the control unit CU turns off the inflow valves 5, to the open state. Thus, the hill hold control is cancelled at step 207 when the engine is started after the end of the idle stop or after the end of the vehicle stop state.

Figure 3:
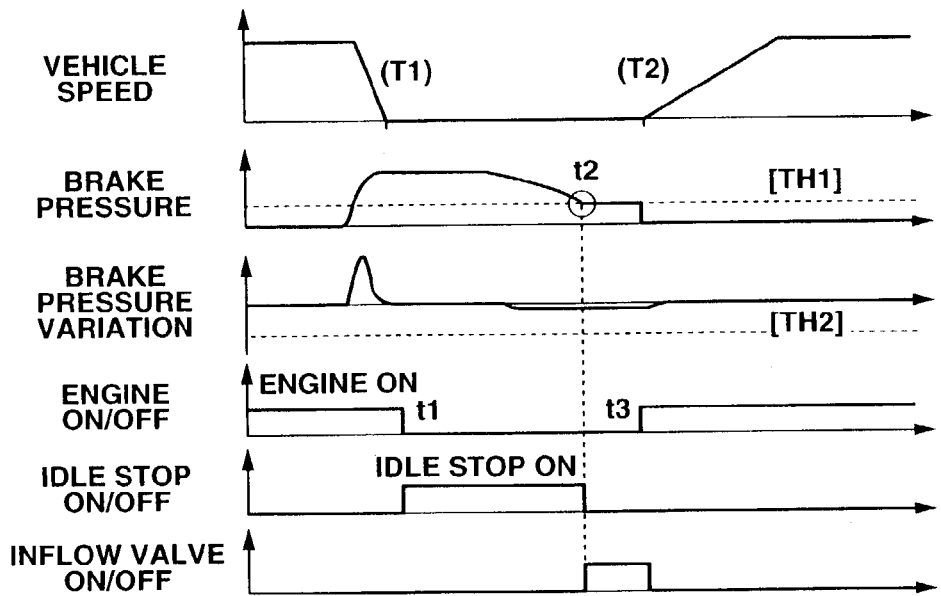
FIGS. 3 and 4 are time charts illustrating operations of the hill hold control process according to the first embodiment in the case of a gentle hill slope (FIG. 3) and a steep hill slope (FIG. 4).
Figure 4:
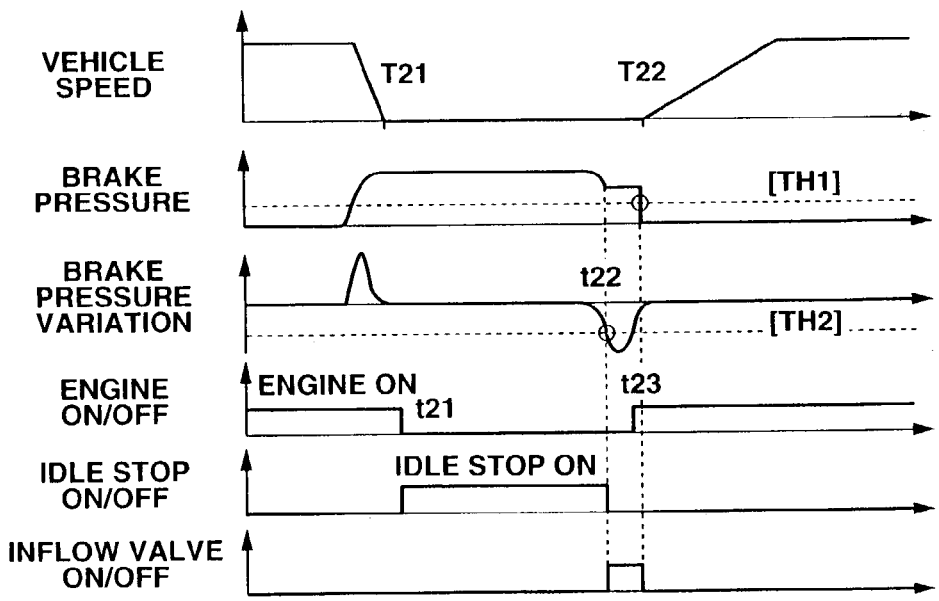

FIGS. 3 and 4 illustrate hill hold operations in this embodiment. In the example of FIG. 3, the vehicle is stopped on a relatively gentle slope at an instant T1, and then started at an instant T2. In the example of FIG. 4, the vehicle is stopped on a relatively steep slope at an instant T21, and then started at an instant T22.

In the example of FIG. 3, the idle stop control is carried out and hence the engine is stopped at instant t1 when the vehicle is stopped on an upward slope and the predetermined idle stop condition is satisfied. The idle stop operation is shown in FIG. 3 by "IDLE STOP ON". At the beginning, the master cylinder pressure is high since the vehicle is stopped by depressing the brake pedal hard on the slope.

Then, if the driver performs a step change operation by releasing the brake pedal and instead depressing the accelerator pedal to start the vehicle, the master cylinder pressure (the brake fluid pressure) decreases, and becomes lower than the hill hold control start judgment threshold TH1 at instant t2. Therefore, the brake control system initiates the hill hold control operation and closes the inflow valves 5 by the control flow of steps 201→202→203→205. Each wheel cylinder WC can produce the braking force to hold the vehicle in the stop state with the then-existing brake fluid pressure confined therein. In the case of a gentle slope as in the example of FIG. 3, the step change from the brake pedal to the accelerator pedal is slow, and the variation of the master cylinder pressure does not lower below the hill hold control start judgment threshold TH2, as shown in FIG. 3.

When the engine is started again at an instant t3 by the fulfillment of a predetermined engine restart condition, for example, by depression of the accelerator pedal, the brake control apparatus opens the inflow valves 5 by the hill hold cancel operation by the control flow of steps 201 or 202→206→207. Therefore, the brake fluid is returned from each wheel cylinder WC to the master cylinder MC, and the braking force is reduced to null. Thus, the engine is started and the vehicle is started (at T2).

In the example of FIG. 4, the brake control apparatus stops the engine by the idle stop control at an instant T21 when the vehicle is stopped on a steep uphill slope, and the predetermined idle stop condition is satisfied, in the same manner as in the example of FIG. 3.

Then, if the driver performs a step change operation by releasing the brake pedal BP and instead depressing the accelerator pedal to start the vehicle, the step change from the brake pedal to the accelerator pedal is rapid in the case of the steep slope. Therefore, the decreasing rate of the master cylinder pressure (the brake pressure) is increased as compared to the gentle slop example of FIG. 3, and accordingly the variation of the master cylinder pressure becomes lower than the second threshold TH2 at an instant t22 before the master cylinder pressure becomes lower than the first threshold TH1. In response to this, the brake control apparatus initiates the hill hold control, and closes the inflow valves 5 at this instant t22 by the control flow of steps 201 → 202 → 203 → 204 → 205. As a result, the brake fluid pressure higher than the first hill hold control start judgment threshold TH1 is confined in each wheel cylinder WC, and the vehicle is held in the stop state securely on the steep uphill.

When the engine is started again at an instant t23 by the fulfillment of the predetermined engine restart condition, for example, the brake control apparatus opens the inflow valves 5 by the hill hold cancel operation. Therefore, the braking force is reduced to null, and the vehicle is started at T22. In this example, a time interval of about 100 msec is interposed from the restart of the engine to the opening of the inflow valves 5 by the hill hold control cancellation, in order to take account of nonuniformity in time from a start of driving a sel-motor to restart the engine to an actual start of the engine.

In this way, the brake control apparatus according to the first embodiment is arranged to perform the first comparison (static pressure comparison) of the master cylinder pressure (brake fluid pressure) with the first hill hold control start judgment threshold TH1 to determine whether the first condition about the master cylinder pressure is satisfied or not, and the second comparison (dynamic pressure comparison) of the rate of change of the master cylinder pressure with the second hill hold control start judgment threshold TH2 to determine whether the second condition about the rate of change is satisfied or not. The hill hold control is carried out if either or both of the first and second conditions are met. Therefore, this brake control system can start the hill hold control adequately in the normal condition without making the first hill hold control start judgment threshold too high, and perform the hill hold control securely even on a steep slope by confining the brake fluid pressure higher than the first hill hold control start judgment threshold TH1 in the wheel cylinders WC.

Without step 204, the threshold TH1 of step 203 must be set high enough to hold the vehicle even on a steep slope. If, however, the first threshold is too high, the first threshold becomes higher than the brake pressure produced by a driver's braking operation, and hence, the control system might start the hill hold control during a driver's braking operation. If, on the other hand, the first threshold is set low, the control system can not hold the vehicle stationary in a reliable manner on a steep slope. Moreover, the master cylinder pressure sensor is more or less inaccurate, and the subtle setting of the first threshold TH1 is difficult. The control system and method including step 204 can meet these problems adequately.

The brake control apparatus shown in FIG. 1 has a simple construction employing the unit for the ABS control. Therefore, this brake control apparatus is advantageous in size reduction and cost reduction. Moreover, the brake control apparatus is arranged to confine the brake fluid pressure in the wheel cylinders WC by closing the inflow valves 5 for the hill hold control. Therefore, it is possible to omit a bypass circuit bypassing the inflow valve 5 and a one-way valve employed in an ABS control system of an earlier technology.

Figure 5:
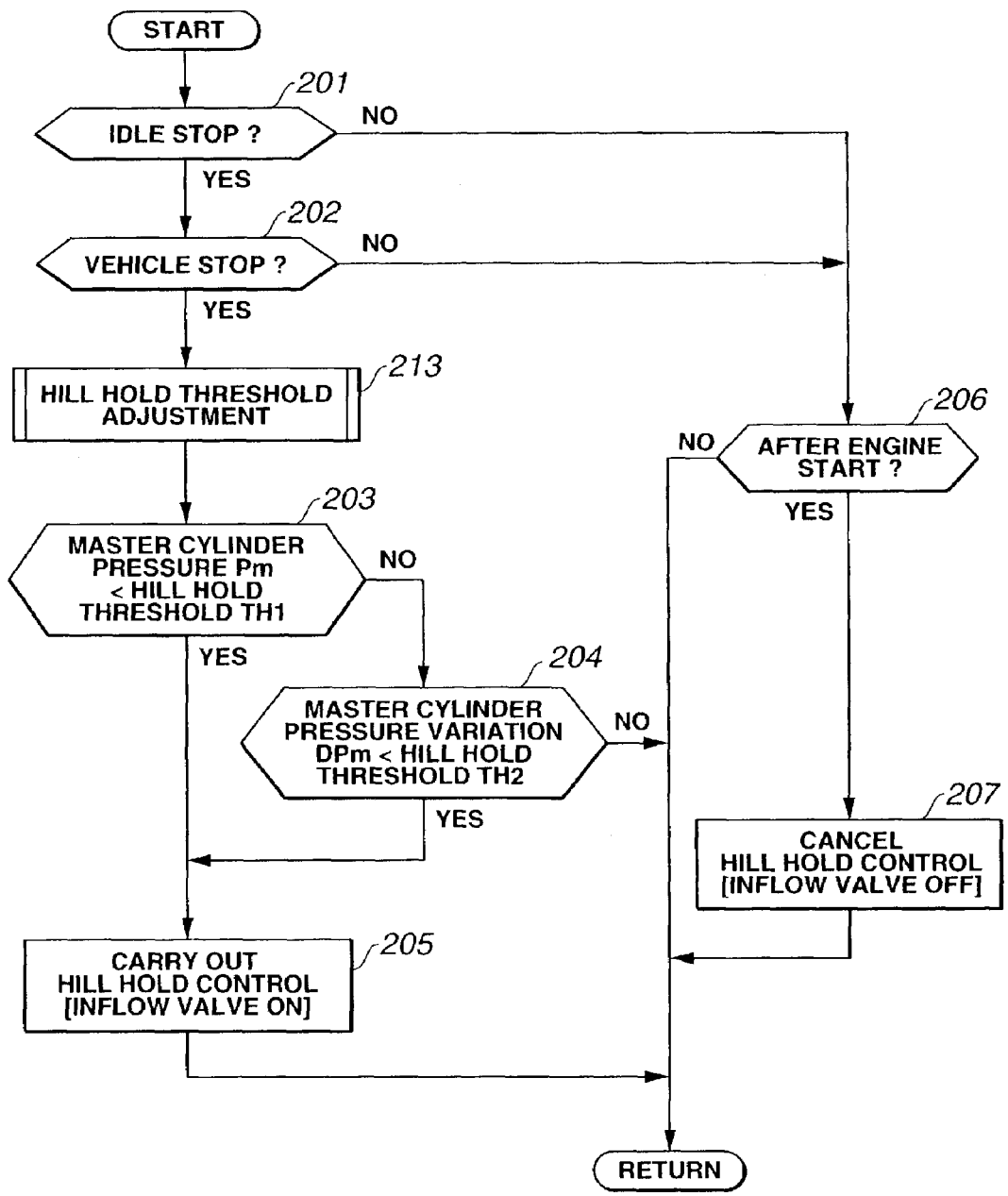
FIG. 5 is a flowchart showing a hill hold brake control process according to a second embodiment of the present invention.

FIG. 5 shows a brake control apparatus according to a second embodiment of the present invention. The brake control apparatus of the second embodiment is identical in construction to the apparatus shown in FIG. 1. Steps 201~207 in FIG. 5 are substantially identical to steps 201~207 shown in FIG. 2. In FIG. 5, a step 213 is interposed between step 202 and step 203.

Figure 6:
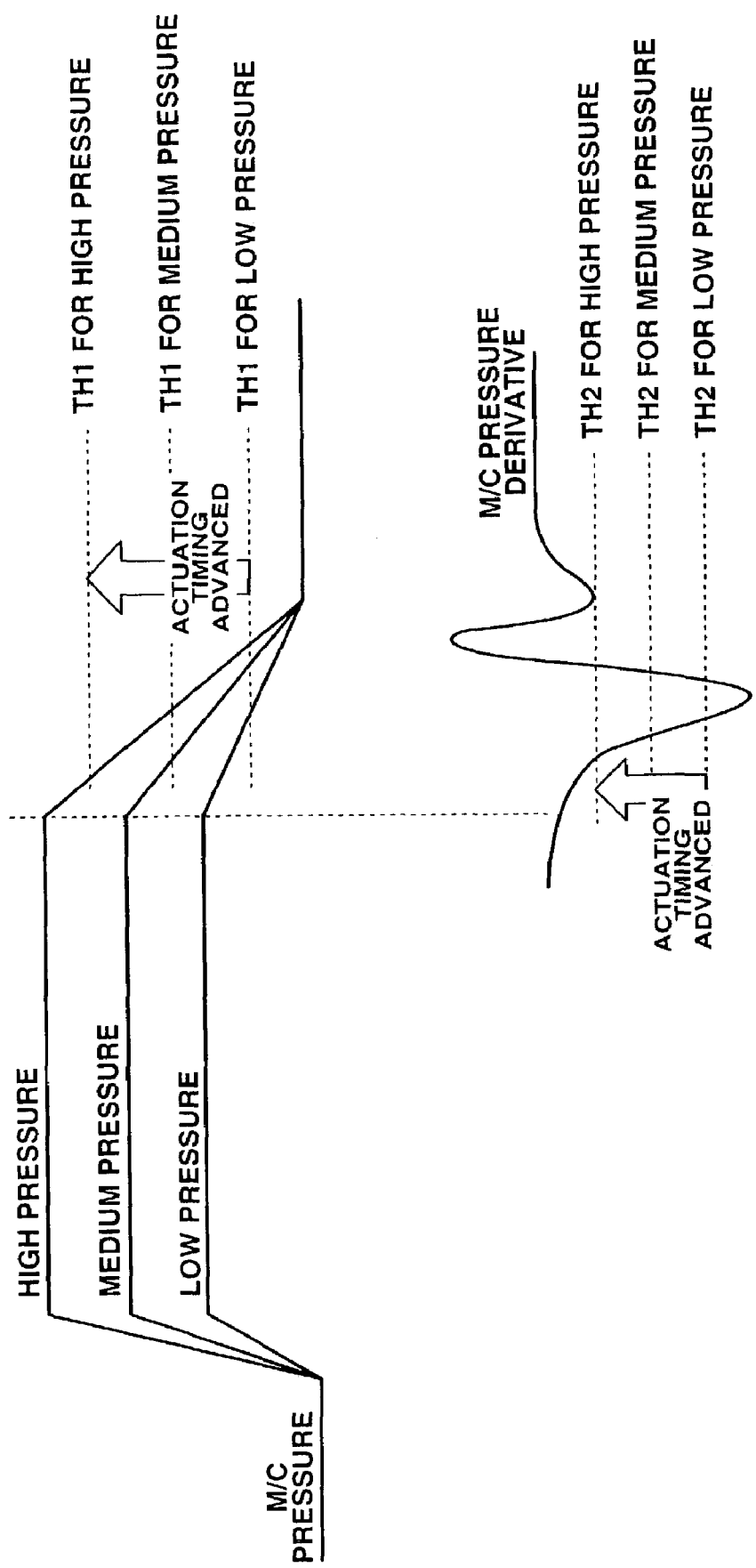
FIG. 6 is a view for illustrating operation for setting a hill hold control start judgment threshold in a first practical example of the second embodiment.

Step 213 is a step for adjusting a hill hold control start judgment threshold in accordance with a parameter representing a road gradient or road grade. In the second embodiment, step 213 is arranged to set each of the first and second hill hold control start judgment thresholds TH1 and TH2 to a value corresponding to the then-existing value of the master cylinder pressure as the parameter representing the road gradient, by lookup from a table as shown in FIG. 6. The first hill hold control start judgment threshold TH1 for the master cylinder pressure is set to a high pressure state first threshold value when the master cylinder pressure is in a high pressure region; a medium pressure state first threshold value when the master cylinder pressure is in a medium pressure region; and a low pressure state first threshold value when the master cylinder pressure is in a low pressure region. Similarly, the second hill hold control start judgment threshold TH2 for the master cylinder pressure variation is set to a high pressure state second threshold value when the master cylinder pressure is in the high pressure region; a medium pressure state second threshold value when the master cylinder pressure is in the medium pressure region; and a low pressure state second threshold value when the master cylinder pressure is in the low pressure region.

Step 203 examines whether the master cylinder pressure Pm is lower than the first hill hold control start judgment threshold TH1 or not. The routine proceeds to step 205 when the master cylinder pressure Pm is lower than the first threshold TH1 (Pm<TH1), and to step 204 when the master cylinder pressure Pm is higher than or equal to the first threshold TH1 (Pm≧TH1). The first hill hold control start judgment threshold (or pressure threshold) TH1 is for detecting a release operation of the brake pedal by the driver. The first hill hold control start judgment threshold TH1 is set equal to a wheel cylinder fluid pressure value adequate to hold the vehicle at the stop state on a slope of a predetermined inclination angle.

Figure 7:
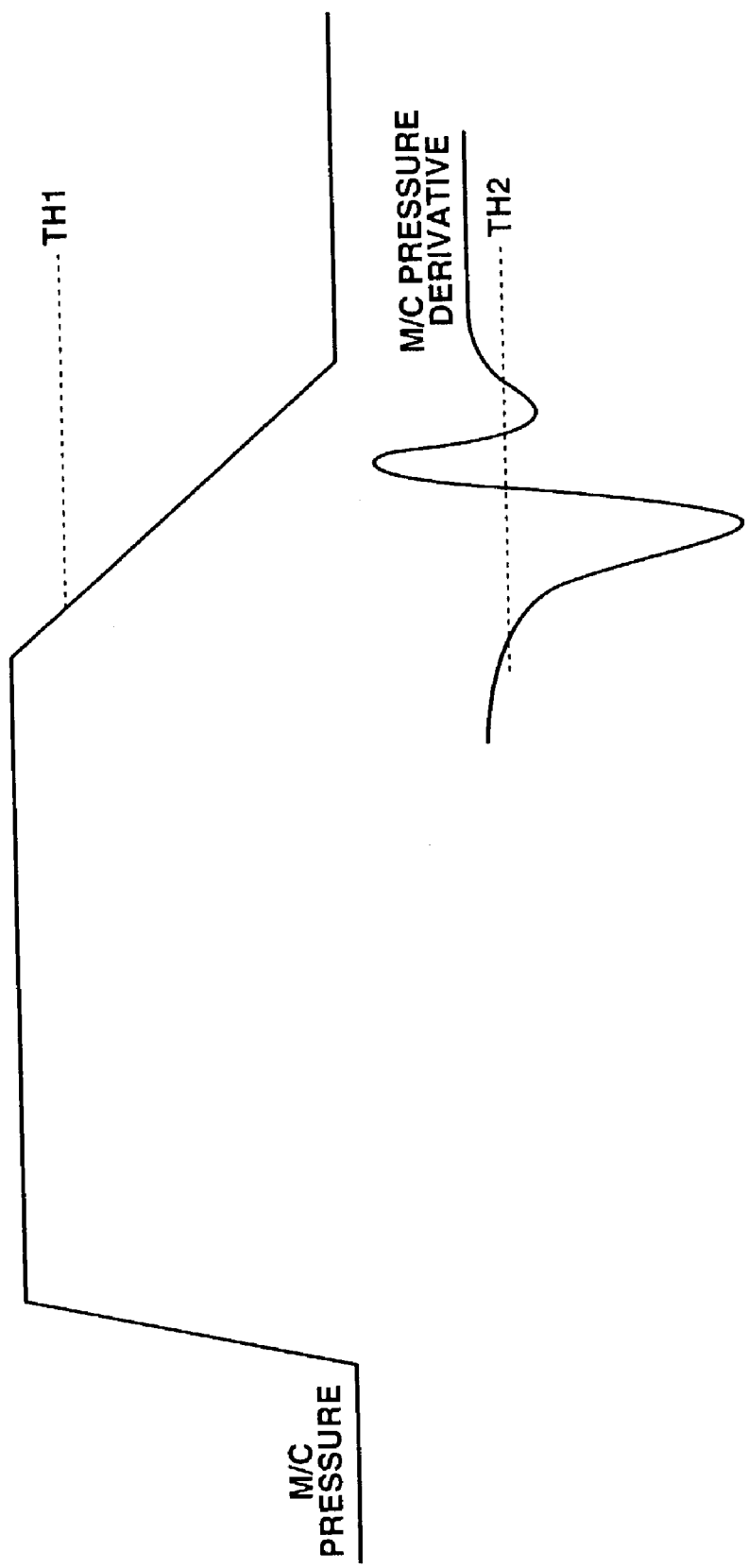
FIG. 7 is a view for illustrating operation for setting a hill hold control start judgment threshold in a second practical example of the second embodiment.

In the example of FIGS. 5–7, the high pressure state first threshold value to which the first threshold TH1 is set in the high master cylinder pressure region is a value adequate to detect a driver's brake pedal release operation on a steep slope of a predetermined inclination angle, and to hold the vehicle in the stop state on the steep slope. The medium pressure state first threshold value used in the medium master cylinder pressure region is a value adequate to detect a driver's brake pedal release operation on a moderate slope of a medium inclination angle, and to hold the vehicle in the stop state on the moderate slope. The low pressure state first threshold value used in the low master cylinder pressure region is a value adequate to detect a driver's brake pedal release operation on a gentle slope of a small inclination angle, and to hold the vehicle in the stop state on the gentle slope. Values of the first hill hold control start judgment threshold TH1 are determined by experiments for vehicle makes and models, and various slope inclination angles.

Step 204 examines whether the variation DPm of the master cylinder pressure Pm is smaller than the predetermined second hill hold control start judgment threshold (or variation threshold) TH2. The master cylinder pressure variation used in step 204 of this example is the time rate of change of the master cylinder pressure. This master cylinder pressure variation is negative when the master cylinder pressure is decreasing. The routine proceeds to step 205 when the master cylinder pressure variation DPm is smaller than the second threshold TH2 (DPm<TH2). When the master cylinder pressure variation DPm is greater than or equal to the second threshold TH2 (DPm≧TH2), this routine ends.

Second threshold TH2 is designed to detect a driver's foot shift operation from the brake pedal to the accelerator pedal. Optimum values for the second threshold TH2 are determined by experiments. In the second embodiment, the high pressure state second threshold value, medium pressure state second threshold value and low pressure state second threshold values are set, respectively, to time rates of change of the master cylinder pressure obtained when the brake pedal BP is released on a steep slope, a medium slop and a gentle slope. As the inclination angle of the road slope becomes greater (steeper), the foot pedal change operation from the brake pedal to the accelerator pedal becomes faster and, accordingly, the rate of change of the master cylinder pressure becomes smaller on the negative side in the case of the pressure decrease (the absolute value becomes greater).

Therefore, the brake control apparatus of this embodiment can detect a driver foot operation from the brake pedal to the accelerator pedal corresponding to the inclination angle of the sloping road determined at step 213, by examining the time rate of change of the master cylinder pressure.

The brake control apparatus according to the second embodiment is operated in the same manner as shown in FIGS. 3 and 4. In the second embodiment, by adjusting the hill hold control start judgment threshold in accordance with the level of the master cylinder pressure, the brake control system can detect the driver's brake pedal release operation promptly and initiate the hill hold control timely. Moreover, the brake control system of the second embodiment can confine the fluid pressure suitable to the road gradient in the brake actuator WC and thereby hold the vehicle reliably on slopes of various inclination angles.

In the example of FIG. 5, the master cylinder pressure sensor is used as a sensor for sensing the road gradient. This arrangement is advantageous in manufacturing cost without the need for an additional sensor.

Step 213 may be designed to determine a value of the hill hold control start judgment threshold in accordance with the gradient parameter representing the road gradient by computation instead of the table lookup. In this case, step 213 can determine a value of each of the first and second hill hold control start judgment thresholds TH1 and TH2 by multiplying the master cylinder pressure sensed at the time of a vehicle stoppage, by a predetermined coefficient. In one example, as shown in FIG. 7, the control unit CU determines the first hill hold control start judgment threshold TH1 (or MPa) by multiplying the master cylinder pressure Pm by a first coefficient K1 (MPa=Pm×K1), and determines the second hill hold control start judgment threshold TH2 (or MPa/S) by multiplying the master cylinder pressure Pm by a second coefficient K2 (MPa/S=Pm×K2). Therefore, the control unit CU can set each threshold to an optimum value in a stepless manner. The coefficients K1 (%) and K2 (%) are determined to optimum values in accordance with vehicle characteristics.

Figure 8:
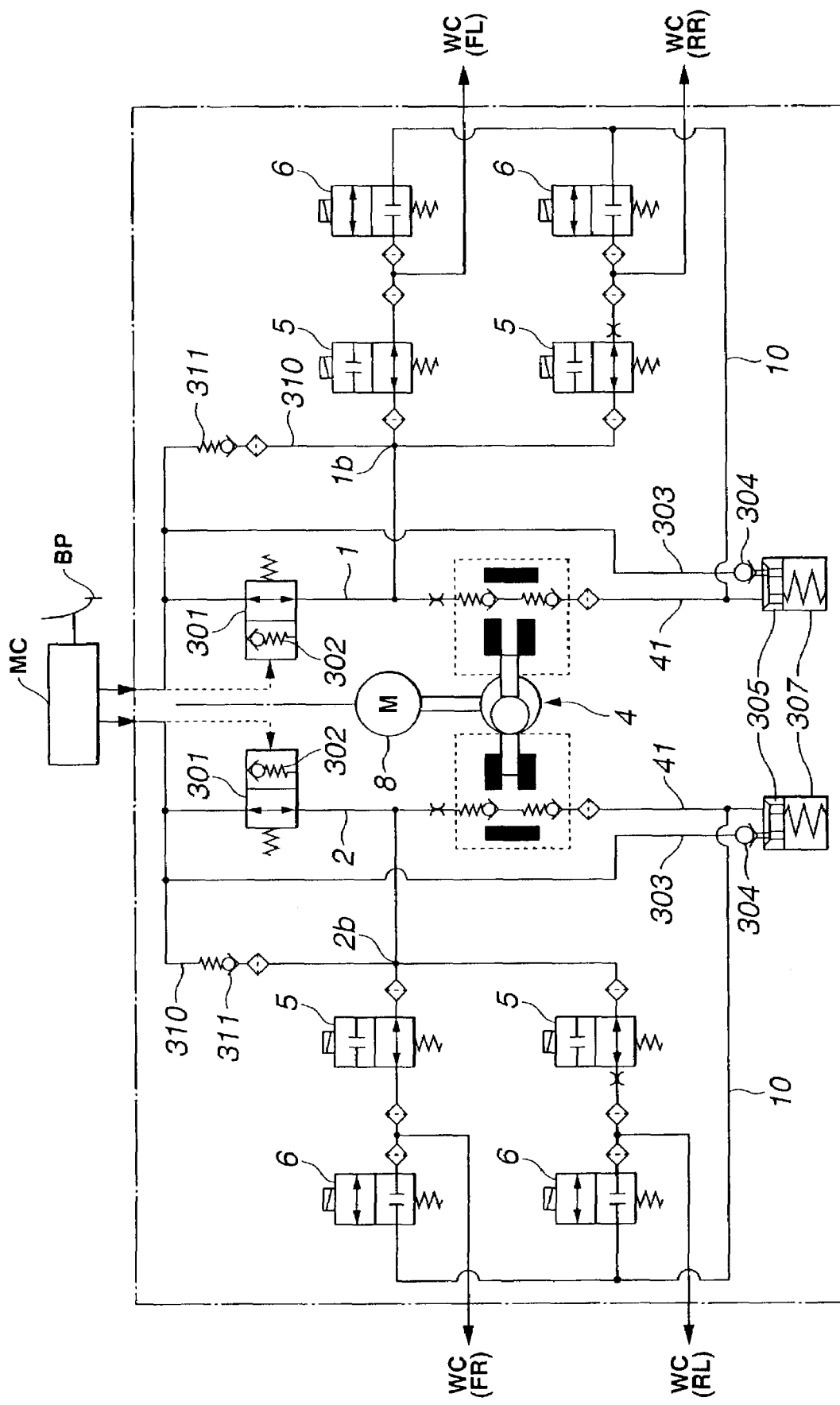
FIG. 8 is schematic view showing a brake system according to a third embodiment of the present invention.

FIG. 8 shows a brake control apparatus according to a third embodiment of the present invention. The brake system of this embodiment is arranged to perform a brake assist control to increase the wheel cylinder pressure to assist a driver's brake pedal operation. The brake system of FIG. 8 is identical to the brake system of FIG. 1 in many points. Identical component parts are given the same reference numerals, and repetitive explanations are omitted. The brake system of FIG. 8 is different from the system of FIG. 1 in the following points.

A gate valve 301 is provided in each brake circuit 1 or 2, at a point upstream of a junction point at which the fluid is discharged by the pump 4. This gate valve 301 is normally in an open state to allow both a downstream flow from the upstream side to the downstream side and an upstream flow from the downstream side to the upstream side, as shown in FIG. 8. When, on the other hand, the master cylinder pressure is increased in response to a driver's brake operation, the master cylinder pressure serves as a pilot pressure for the gate valve 301, and brings the gate valve 301 of each circuit 1 or 2 to a closed state. In the closed state, the gate valve 301 prevents the reverse (upstream) flow from the wheel cylinder's side to the master cylinder's side with the function of a one-way valve 302, and permits the downstream flow from the master cylinder's side to the wheel cylinder's side.

A bypass circuit 310 is provided for each gate valve 301. Each bypass circuit 310 is connected in parallel with the mating gate valve 301. A one-way valve 311 is disposed in each bypass circuit 310, and arranged to permit the fluid flow only in the direction from the wheel cylinder's side to the master cylinder's side. Therefore, the fluid pressure of wheel cylinder WC can return to master cylinder MC, notwithstanding the gate valve 301 being in the closed state, when the driver terminates the brake operation.

A reservoir 307 for each circuit 1 or 2 is connected to the master cylinder's side by a suction circuit 303. At the end of suction circuit 303 connected with the reservoir 307, there is provided a valve mechanism 304. When the reservoir 307 is in a state storing the brake fluid, this valve mechanism 304 is put in a closed state to prevent fluid communication from suction circuit 303 to the reservoir 307. When the reservoir 307 is in a state in which no brake fluid is stored in the reservoir 307, a valve element of the valve mechanism 304 is pushed upward by a piston 305, and the valve mechanism 304 permits the fluid communication from the suction circuit 303 into the reservoir 307.

In the thus-constructed brake system of FIG. 8, the gate valve 301 for each circuit 1 or 2 is closed when the driver depresses the brake pedal, and the assist control is carried. In this case, the pump 4 is driven and the brake fluid sucked by the pump 4 is discharged to the downstream side of the gate valve 301. As a result, the wheel cylinder WC is supplied with the brake fluid pressure higher than the master cylinder pressure.

In this embodiment, the hill hold control is performed in the manner shown in FIG. 5. In the case of the hill hold control, the brake system of FIG. 8 maintains the braking force by confining the brake fluid pressure in each wheel cylinder WC by closing the inflow valve 5. The brake system shown in FIG. 8 can confine the brake fluid pressure raised higher than the master cylinder pressure at the beginning of the hill hold control, and thereby hold the vehicle securely in the stop state.

The present invention is not limited to the illustrated embodiments. Instead of FIG. 5, the third embodiment shown in FIG. 8 can employ the hill hold control process shown in FIG. 2. In the second embodiment shown in FIGS. 5 and 6, each of the hill hold control start judgment thresholds is changed in a three-valued manner of three steps. However, it is optional to vary each threshold continuously or to change each threshold in the manner of two steps or four or more steps. The example of FIG. 5 employs the first and second hill hold control start judgment thresholds. However, it is optional to employ only the first threshold TH1 for the master cylinder pressure.

In the example shown in FIG. 6, the master cylinder pressure is used as a parameter representing the road gradient. However, it is possible to employ an acceleration sensor or some other sensor for sensing the road gradient directly.

The brake system employed in each illustrated embodiment is of the type including wheel cylinders WC operated by the master cylinder pressure. In the present invention, however, it is optional to employ a brake-by-wire type system arranged to produce a brake fluid pressure with a pressure generating apparatus such as a pump in response to a driver's brake operation, and to supply the produced brake fluid pressure to wheel cylinders. Moreover, it is possible to employ a brake system including a motor for actuating a brake pad in response to a driver's brake operation. The brake system according to the present invention may be a hydraulic brake system using brake liquid (oil) or may be a pneumatic system operated by air or other gas. Though the brake actuator is a wheel cylinder in the illustrated embodiments, the brake actuator may be an actuator of some other type.

Though, in the illustrated embodiments, the invention is applied to a vehicle equipped with an automatic transmission, the present invention is applicable to a vehicle with a manual transmission and a vehicle with a continuously variable transmission. In the illustrated embodiments, the pressure control valve used for the hill hold control is made up of the inflow and outflow valves 5 and 6. However, the pressure control valve may be a single valve having a first position connecting the upstream side and the downstream side and shutting off the drain circuit; a second position shutting off the upstream side and connecting the downstream side and the drain circuit; and a third position shutting off each of the upstream side, the downstream side and the drain circuit. In this case, the single valve is put in the second position for the control canceling operation. In the illustrated embodiments, the pressure control valve of the inflow and outflow valves is used as means for confining the brake fluid in the brake actuator. However, in the case of a brake system having a gate valve disposed on the upstream side of the inflow valve and arranged to be closed to produce the brake pressure positively, it is optional to use the gate valve as the means for confining the brake fluid in the brake actuator. In this case, it is possible to drive the pump and increase the brake pressure when the gate valve is closed for the hill hold control.

This application is based on prior Japanese Patent Applications No. 2002-010639, filed in Japan on Jan. 18, 2002; and No 2002-119092, filed in Japan on Apr. 22, 2002. The entire contents of these Japanese Patent Applications Nos. 2002-010639 and 2002-119092 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus comprising:
   a master cylinder to produce a brake fluid pressure in response to a driver's braking operation;
   a brake actuating section connected with the master cylinder, to receive the brake fluid pressure from the master cylinder and to produce a braking force to brake a vehicle;
   a vehicle sensor to sense a vehicle condition; and
   a hill hold control section to initiate a hill hold control to hold the vehicle in a stopped state by the braking force produced by the brake actuating section even after an end of the driver's braking operation, at a hill hold start timing determined in accordance with a hill hold control start adjustment parameter determined from the vehicle condition sensed by the vehicle sensor when the vehicle is in the stopped state,
   wherein the hill hold control start adjustment parameter is a parameter indicative of a road gradient of a road on which the vehicle is stopped, and
   wherein the hill hold control section is configured to control the hill hold start timing in accordance with the hill hold control start adjustment parameter to advance the hill hold start timing in accordance with the road gradient.

2. The brake control apparatus as claimed in claim 1, wherein the vehicle sensor includes a sensor to sense the road gradient of a road on which the vehicle is stopped; and the hill hold control section is configured to initiate the hill hold control at the hill hold start timing determined in accordance with the road gradient.

3. The brake control apparatus as claimed in claim 1, wherein the vehicle sensor includes a pressure sensor to sense a master cylinder pressure, and the hill hold control section is configured to initiate the hill hold control at the hill hold start timing determined in accordance with the master cylinder pressure and a variation of the master cylinder pressure.

4. The brake control apparatus as claimed in claim 3, wherein the variation of the master cylinder pressure is a time rate of change of the master cylinder pressure.

5. The brake control apparatus as claimed in claim 3, wherein the hill hold control section is configured to compare the master cylinder pressure with a pressure threshold and the variation of the master cylinder pressure with a variation threshold, and produce a hill hold command signal to initiate the hill hold control when at least one of a first condition and a second condition is satisfied, the first condition being satisfied when the master cylinder pressure is lower than the pressure threshold, the second condition being satisfied when the variation of the master cylinder pressure is smaller than the variation threshold.

6. The brake control apparatus as claimed in claim 3, wherein the hill hold control section is configured to determine the hill hold start timing by examining a master cylinder pressure and the variation of the master cylinder pressure after the vehicle is brought to the stopped state.

7. The brake control apparatus as claimed in claim 3, wherein the hill hold control section is configured to determine the hill hold start timing normally in accordance with the master cylinder pressure in a normal mode, and to advance the hill hold control start timing, as compared to the normal mode, in accordance with the variation of the master cylinder pressure when the master cylinder pressure is decreased rapidly.

8. The brake control apparatus as claimed in claim 1, wherein the brake actuating section comprises a brake actuator to produce the braking force, and a pressure holding section to confine the brake fluid pressure in the brake actuator in the hill hold control to hold the vehicle in the stopped state.

9. The brake control apparatus as claimed in claim 8, wherein the brake actuating section comprises an anti-skid brake control actuating section which comprises the pressure holding section including a pressure control valve having a pressure increase state to increase the brake fluid pressure in the brake actuator by supplying the brake fluid pressure from the master cylinder, a pressure decrease state to decrease the brake fluid pressure in the brake actuator by draining brake fluid from the brake actuator, and a pressure hold state to hold the brake fluid pressure in the brake actuator by confining the brake fluid pressure in the brake actuator; and the hill hold control section is configured to perform the hill hold control by putting the pressure control valve in the pressure hold state.

10. The brake control apparatus as claimed in claim 9, wherein the anti-skid brake control actuating section further comprises: a reservoir; a drain circuit to convey the brake fluid from the brake actuator to the reservoir; a suction circuit; a discharge circuit leading to a supply circuit extending from the master cylinder to the brake actuating section; and a pump to suck the brake fluid from the reservoir through the suction circuit, and to deliver the brake fluid to the supply circuit through the discharge circuit; and wherein the pressure control valve comprises an inflow valve to open and close the supply circuit and an outflow valve to open and close the drain circuit between the brake actuator and the reservoir.

11. A brake control apparatus comprising:
a master cylinder to produce a brake fluid pressure in response to a driver's braking operation;
a brake actuating section connected with the master cylinder, to receive the brake fluid pressure from the master cylinder and to produce a braking force to brake a vehicle;
a vehicle sensor to sense a vehicle condition; and
a hill hold control section to initiate a hill hold control to hold the vehicle in a stopped state by the braking force produced by the brake actuating section even after an end of the driver's braking operation, in accordance with a hill hold control start adjustment parameter determined from the vehicle condition sensed by the vehicle sensor when the vehicle is in the stopped state,
wherein the hill hold control start adjustment parameter is a parameter indicative of a road gradient of a road on which the vehicle is stopped, and
wherein the hill hold control section is configured to initiate the hill hold control by comparing a hill hold related parameter with a threshold, and to adjust the threshold in accordance with the hill hold control start adjustment parameter indicative of the road gradient.

12. The brake control apparatus as claimed in claim 11, wherein the vehicle sensor includes a pressure sensor to sense a master cylinder pressure of the master cylinder and the hill hold control section is configured to initiate the hill hold control when the master cylinder pressure, as the hill hold related parameter becomes lower than the threshold, and to increase the threshold when the road gradient becomes steeper.

13. The brake control apparatus as claimed in claim 12, wherein the hill hold control section is configured to determine a hill hold start timing by examining a master cylinder pressure and a variation of the master cylinder pressure after the vehicle is brought to the stopped state.

14. The brake control apparatus as claimed in claim 12, wherein a variation of a master cylinder pressure is used as the hill hold control start adjustment parameter indicative of the road gradient.

15. A brake control apparatus comprising:
a master cylinder to produce a brake fluid pressure in response to a driver's braking operation;
a brake actuating section connected with the master cylinder, to receive the brake fluid pressure from the master cylinder and to produce a braking force to brake a vehicle;
a vehicle sensor to sense a vehicle condition; and
a hill hold control section to initiate a hill hold control to hold the vehicle in a stopped state by the braking force produced by the brake actuating section even after an end of the driver's braking operation, in accordance with a hill hold control start adjustment parameter determined from the vehicle condition sensed by the vehicle sensor when the vehicle is in the stopped state,
wherein the hill hold control start adjustment parameter is a parameter indicative of a road gradient of a road on which the vehicle is stopped,
wherein the hill hold control section is configured to initiate the hill hold control by comparing a hill hold related parameter with a threshold, and to adjust the threshold in accordance with the hill hold control start adjustment parameter indicative of the road gradient, wherein the vehicle sensor includes a pressure sensor to sense a master cylinder pressure of the master cylinder and the hill hold control section is configured to initiate the hill hold control when the master cylinder pressure, as the hill hold related parameter, becomes lower than the threshold, and to increase the threshold when the road gradient becomes steeper, and wherein the hill hold control section is configured to vary the threshold in accordance with the master cylinder pressure which is used as the hill hold control start adjustment parameter indicative of the road gradient.

16. The brake control apparatus as claimed in claim 15, wherein the hill hold control section is configured to compare the master cylinder pressure with a pressure threshold to determine whether a first condition regarding the master cylinder pressure is satisfied, and to compare a variation of the master cylinder pressure with a variation threshold to determine whether a second condition regarding the variation is satisfied, and to produce a hill hold command signal to initiate the hill hold control when at least one of the first and second conditions is satisfied.

17. The brake control apparatus as claimed in claim 16, wherein the hill hold control section is configured to adjust at least one of the pressure threshold and the variation threshold in accordance with the hill hold control start adjustment parameter.

18. A brake control apparatus comprising:
a master cylinder to produce a brake fluid pressure in response to a driver's braking operation;
a brake actuating section connected with the master cylinder, to receive the brake fluid pressure from the master cylinder and to produce a braking force to brake a vehicle;
a vehicle sensor to sense a vehicle condition; and
a hill hold control section to initiate a hill hold control to hold the vehicle in a stopped state by the braking force produced by the brake actuating section even after an end of the driver's braking operation, in accordance with a hill hold control start adjustment parameter determined from the vehicle condition sensed by the vehicle sensor when the vehicle is in the stopped state,
wherein the hill hold control start adjustment parameter is a parameter indicative of a road gradient of a road on which the vehicle is stopped,
wherein the hill hold control section is configured to initiate the hill hold control by comparing a hill hold related parameter with a threshold, and to adjust the threshold in accordance with the hill hold control start adjustment parameter indicative of the road gradient, and
wherein the hill hold control section is configured to determine the threshold in accordance with the hill hold control start adjustment parameter by referencing a predetermined table.

19. A brake control apparatus comprising:
a master cylinder to produce a brake fluid pressure in response to a driver's braking operation;
a brake actuating section connected with the master cylinder, to receive the brake fluid pressure from the master cylinder and to produce a braking force to brake a vehicle;
vehicle sensor to sense a vehicle condition; and
a hill hold control section to initiate a hill hold control to hold the vehicle in a stopped state by the braking force produced by the brake actuating section even after an end of the driver's braking operation, in accordance with a hill hold control start adjustment parameter determined from the vehicle condition sensed by the vehicle sensor when the vehicle is in the stopped state,
wherein the hill hold control start adjustment parameter is a parameter indicative of a road gradient of a road on which the vehicle is stopped,
wherein the hill hold control section is configured to initiate the hill hold control by comparing a hill hold related parameter with a threshold, and to adjust the threshold in accordance with the hill hold control start adjustment parameter indicative of the road gradient, and
wherein the hill hold control section is configured to determine the threshold in accordance with the hill hold control start adjustment parameter indicative of the road gradient by substituting a value of the hill hold control start adjustment parameter into a predetermined mathematical equation.

20. A brake control apparatus comprising:
a master cylinder to produce a brake fluid pressure in response to a driver's braking operation;
a brake actuator connected with the master cylinder, to receive the brake fluid pressure from the master cylinder and to produce a braking force to brake a vehicle;
a pressure control section connected between the master cylinder and the brake actuator, and arranged to increase the brake fluid pressure in the brake actuator when the pressure control section is in a pressure increase state, to decrease the brake fluid pressure in the brake actuator when the pressure control section is in a pressure decrease state, and to hold the brake fluid pressure in the brake actuator when the pressure control section is in a pressure hold state, the pressure control section being put in the pressure hold state in a hill hold control to hold the vehicle in a stopped state by the braking force produced by the brake actuator even after an end of the driver's braking operation;
a pressure sensor to sense a master cylinder pressure of the master cylinder; and
a hill hold control section to determine a hill hold control start timing to initiate the hill hold control, by comparing the master cylinder pressure with a predetermined pressure threshold, and to modify the hill hold control start timing in accordance with a hill hold control start adjustment parameter indicative of a road gradient.

21. The brake control apparatus as claimed in claim 20, wherein the hill hold control section is configured to initiate the hill hold control when the master cylinder pressure becomes lower than the predetermined pressure threshold, if the hill hold adjustment parameter is in a state to indicate that the road gradient is not steep, and to initiate the hill hold control start timing before the master cylinder pressure becomes lower than the predetermined pressure threshold, if the hill hold start adjustment parameter is in a state to indicate that the road gradient is steep.

22. A hill hold brake control process comprising:
a first process element of examining whether a vehicle is in a predetermined stop state;
a second process element of initiating a hill hold control to hold the vehicle in the stop state at a hill hold start timing determined by comparing a first parameter indicative of a driver's brake pedal force with a first threshold; and a third process element of adjusting the hill hold control start timing to initiate the hill hold control in accordance with a gradient parameter indicative of a road gradient.

23. The hill hold brake control process as claimed in claim 22, wherein the third process element comprises a subelement comparing the gradient parameter with a second threshold, and advancing the hill hold control start timing when the road gradient becomes steeper.

24. A hill hold brake control process as claimed in claim 22, wherein the third process element comprises a subelement of adjusting the first threshold in accordance with the gradient parameter.

25. The hill hold brake control process as claimed in claim 22, wherein a variation of a master cylinder pressure is used as the gradient parameter indicative of the road gradient.

26. The brake control process as claimed in claim 22, wherein the second process element includes an operation of initiating the hill hold control when the first parameter, which is a master cylinder pressure becomes lower than the first threshold, and wherein the third process element includes a subelement of initiating the hill hold control in accordance with the gradient parameter before the master cylinder pressure becomes lower than the first threshold.

27. The brake control process as claimed in claim 22, wherein the first process element comprises a subelement of examining whether an engine of the vehicle is in an idle stopped state or not, and allowing the hill hold control only when the engine is in the idle stop state.

28. A brake control apparatus comprising:

a master cylinder to produce a brake fluid pressure in response to a driver's braking operation;

a brake actuating section connected with the master cylinder, to receive the brake fluid pressure from the master cylinder and to produce a braking force to brake a vehicle;

a vehicle sensor to sense a driver's brake release operation, and a vehicle condition indicative of a road gradient of a road; and a hill hold control section to initiate a hill hold control to prevent the braking force of the brake actuating section from being decreased by the driver's brake release operation, at a hill hold control start timing during the driver's brake release operation, so as to hold the braking force to hold the vehicle in a stopped state even after a brake pedal is fully released, and to control the hill hold control start timing to initiate the hill hold control, in accordance with the vehicle condition indicative of the road gradient, to initiate the hill hold control earlier during the driver's brake release operation when the road gradient is steeper and to initiate the hill hold control later during the driver's brake release operation when the road gradient is less steep.

29. A brake control apparatus comprising:

a master cylinder to produce a brake fluid pressure in response to a driver's braking operation;

a brake actuating section connected with the master cylinder, to receive the brake fluid pressure from the master cylinder and to produce a braking force to brake a vehicle;

a vehicle sensor to sense a vehicle condition; and a hill hold control section to initiate a hill hold control to hold the vehicle in a stopped state by holding the braking force of the brake actuating section even after an end of the driver's braking operation if an engine of the vehicle is stopped, and to control a hill hold control start timing to initiate the hill hold control in accordance with a hill hold control start adjustment parameter indicative of a road gradient of a road, determined from the vehicle condition sensed by the vehicle sensor when the vehicle is in the stopped state.

* * * * *